United States Patent [19]
Kahamura et al.

[11] Patent Number: 5,259,176
[45] Date of Patent: Nov. 9, 1993

[54] COTTER DEVICE FOR LAWN MOWER

[75] Inventors: Ryo Kahamura; Kenjiro Haratsuna, both of Saitama; Naoki Kinoshita, Tokyo, all of Japan

[73] Assignee: Honda Giken Kogyo Kabushiki Kaisha, Tokyo, Japan

[21] Appl. No.: 840,144

[22] Filed: Feb. 24, 1992

[51] Int. Cl.⁵ ............................................. A01D 34/68
[52] U.S. Cl. ........................................ 56/255; 56/295; 56/DIG. 20
[58] Field of Search ........ 56/255, 295, 17.5, DIG. 17, 56/DIG. 20

[56] References Cited

U.S. PATENT DOCUMENTS

| | | | |
|---|---|---|---|
| 2,760,327 | 8/1956 | Bovee. | |
| 4,161,096 | 7/1979 | Biberger | 56/295 X |
| 4,426,831 | 1/1984 | Khas et al. | 56/17.5 X |
| 4,736,576 | 4/1988 | Mallaney et al. | 56/255 |
| 4,922,698 | 5/1990 | Taylor | 56/17.5 X |
| 4,977,735 | 12/1990 | Davis | 56/295 |
| 5,019,113 | 5/1991 | Burnell | 56/17.5 X |
| 5,109,656 | 5/1992 | Zimmer | 56/295 X |

FOREIGN PATENT DOCUMENTS 64-6035  2/1989  Japan.

Primary Examiner—Terry Lee Melius
Attorney, Agent, or Firm—Howard L. Rose

[57] ABSTRACT

A lawn mower has a cutter device which includes lower and upper cutter blades coupled to a rotatable shaft drivable by an engine and substantially horizontally rotatable in a direction. The lower cutter blade has a distal end region including a cutting edge facing in the direction of rotation. The upper cutter blade extends substantially parallel to the lower cutter blade, and has a distal end region including a cutting edge facing in the direction of rotation and positioned forwardly of the cutting edge of the lower cutter blade. The width of the distal end region of the lower cutter blade is larger than the width of the distal end region of the upper cutter blade. The distal end regions of the lower and upper cutter blades extend substantially parallel to each other and are vertically spaced from each other, with an air passage defined therebetween. The lower cutter blade has a substantially upwardly raised portion disposed behind the cutting edge thereof in the direction of rotation for directing an air flow upwardly in the air passage.

28 Claims, 10 Drawing Sheets

FIG.13
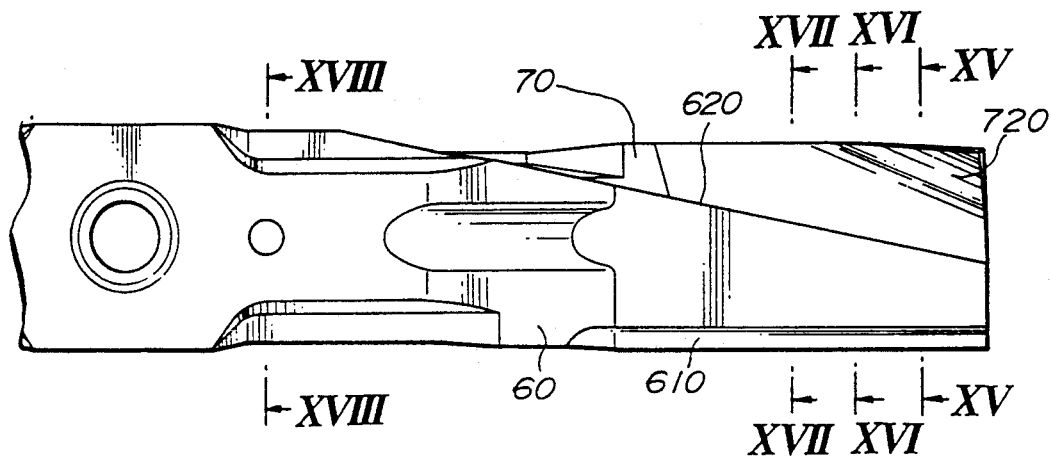
FIG.14  FIG.15  FIG.16  FIG.17
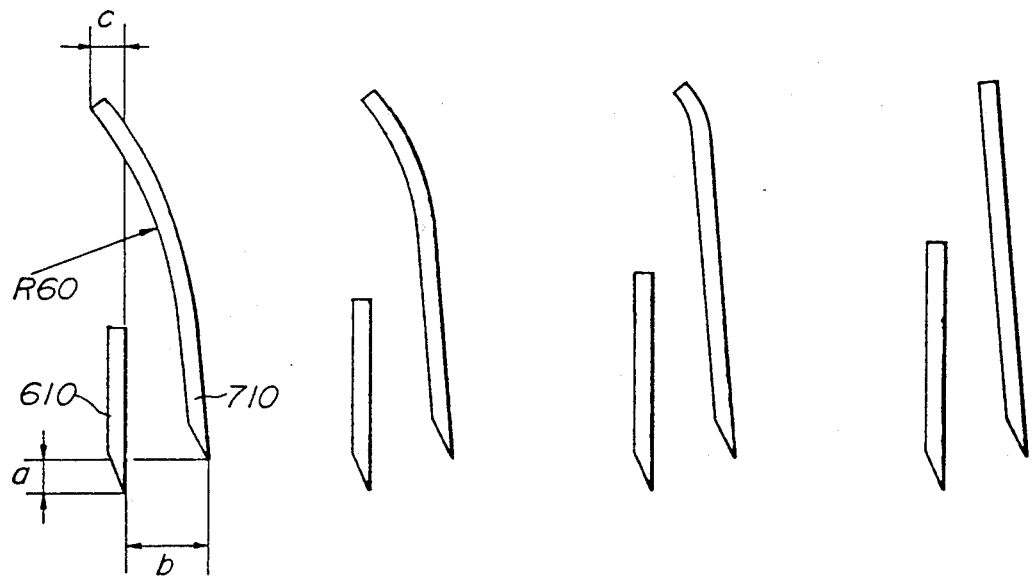

COTTER DEVICE FOR LAWN MOWER

BACKGROUND OF THE INVENTION

1. Field of the Invention

The present invention relates to a cutter device for use in a lawn mower, and more particularly to a cutter device comprising a pair of vertically superposed cutter blades that is rotatable in a substantially horizontal plane.

2. Description of the Prior Art

One conventional lawn mower has a downwardly opening cutter housing and a pair of cutter blades that is housed in the cutter housing and rotatable in a substantially horizontal plane. The cutter blades are vertically superposed one on the other. The upper cutter blade is positioned forwardly of the lower cutter blade in the direction in which they rotate, for clipping the grass twice to eliminate any region where the grass remains uncut. Such prior lawn mower is disclosed in U.S. Pat. No. 2,760,327 and Japanese utility model publication No. 64-6035.

The grass which remains uncut by the upper cutter blade is forcibly pressed down by an air flow caused by the upper cutter blade. Therefore, the remaining grass that is pressed down may not effectively be clipped by the lower cutter blade that follows the upper cutter blade. As a result, the lawn that is mowed by the lawn mower may not neatly be finished. Moreover, if the inner surface of the cutter housing is not properly spaced from the circular path of the outermost ends of the cutter blades, then the gap between the inner surface of the cutter housing and the outermost ends of the cutter blades may possibly be clogged with grass clippings, or grass clippings may possibly fall together and form grass clipping ridges on the lawn along the direction in which the lawn mower moves forwardly.

SUMMARY OF THE INVENTION

In view of the aforesaid problems of the conventional lawn mower, it is an object of the present invention to provide a cutter device for a lawn mower, which comprises a pair of vertically superposed cutter blades capable of raising the grass of a lawn so as to be able to neatly finish the lawn and to cut off the glass into small clippings when the lawn is mowed by the lawn mower.

According to the present invention, there is provided a cutter device for use in a lawn mower having a substantially vertical rotatable shaft, comprising a lower cutter blade adapted to be coupled to the rotatable shaft and substantially horizontally rotatable in a direction, the lower cutter blade having a distal end region including a cutting edge facing in said direction, and an upper cutter blade adapted to be coupled to the rotatable shaft and substantially horizontally rotatable in said direction, the upper cutter blade extending substantially parallel to the lower cutter blade, and having a distal end region including a cutting edge facing in said direction and positioned forwardly of the cutting edge of the lower cutter blade, the distal end regions of the lower and upper cutter blades having respective widths in said direction, the width of the distal end region of the lower cutter blade being larger than the width of the distal end region of the upper cutter blade, the distal end regions of the lower and upper cutter blades extending substantially parallel to each other and being vertically spaced from each other, with an air passage defined therebetween, the lower cutter blade having a substantially upwardly raised, portion disposed behind the cutting edge thereof in said direction for directing an air flow upwardly in the air passage.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIG. 11b is a side elevational view of the upper cutter blade shown in FIG. 11a;

FIG. 12b is a side elevational view of the lower cutter blade shown in FIG. 12a;

FIG. 13 is a fragmentary plan view of the cutter blades, as vertically superposed, shown in FIG. 10;

FIG. 14 is an enlarged side elevational view of the cutter blades shown in FIG. 13;

FIG. 15 is an enlarged cross-sectional view taken along line XV—XV of FIG. 13;

FIG. 16 is an enlarged cross-sectional view taken along line XVI—XVI of FIG. 13;

FIG. 17 is an enlarged cross-sectional view taken along line XVII—XVII of FIG. 13.

DETAILED DESCRIPTION OF THE PREFERRED EMBODIMENTS

Figure 1:
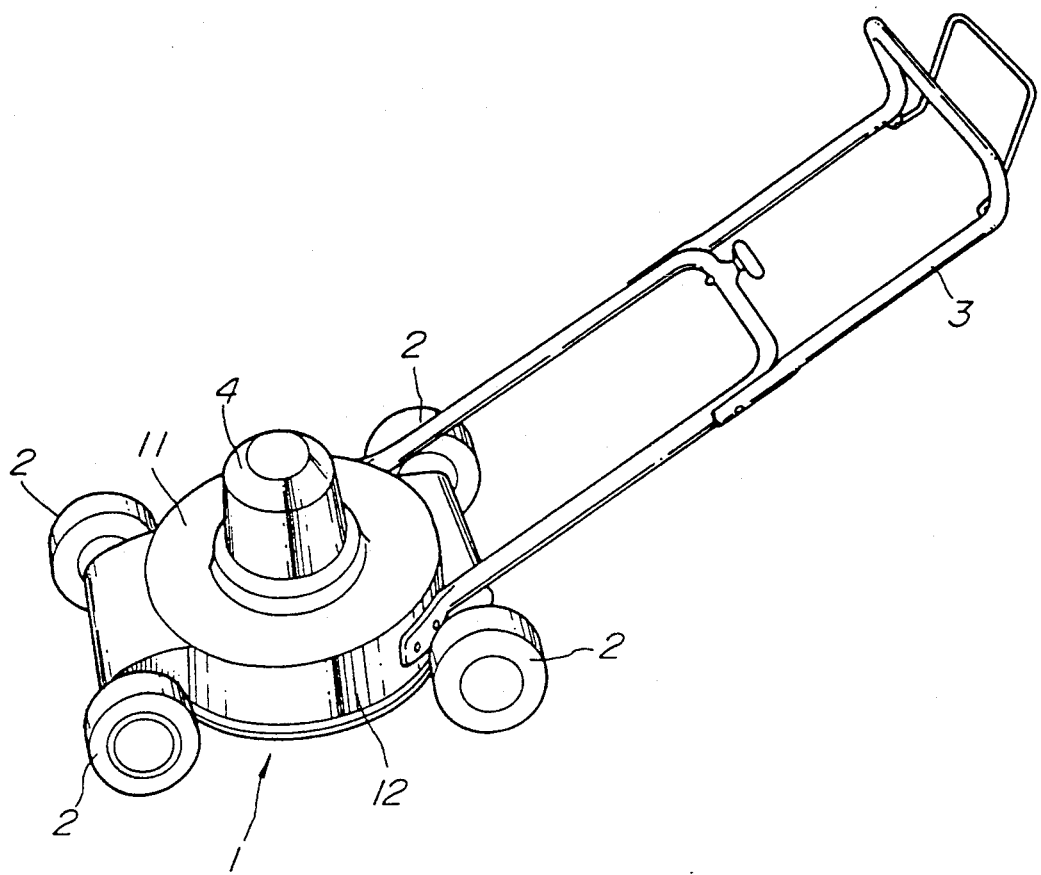
FIG. 1 is a perspective view of a walking-type lawn mower incorporating a cutter device according to a first embodiment of the present invention.

FIG. 1 shows walking-type lawn mower incorporating a cutter device according to a first embodiment of the present invention. The lawn mower generally comprises a cutter housing 1, wheels 2, a handle 3, and an engine case 4. The cutter housing 1, which is part of the cutter device according to the present invention, houses a substantially vertical rotatable shaft 5 (FIG. 2) extending through an upper circular wall 11 of the cutter housing 1 and drivable by an engine (not shown) housed in the engine case 4. The cutter device comprises a pair of upper and lower horizontal cutter blades 6, 7 fixed to the lower end of the rotatable shaft 5 and vertically superposed one on the other in their central regions. The cutter blades 6, 7 are rotatable in a substantially horizontal plane by the engine through the rotatable shaft 5.

The cutter housing 1 has a vertically continuous circumferential wall 12 extending from the outer circumferential edge of the upper wall 11 through a round corner. The cutter housing 1 is closed at its upper and circumferential walls thereof, but open downwardly.

Figure 3:
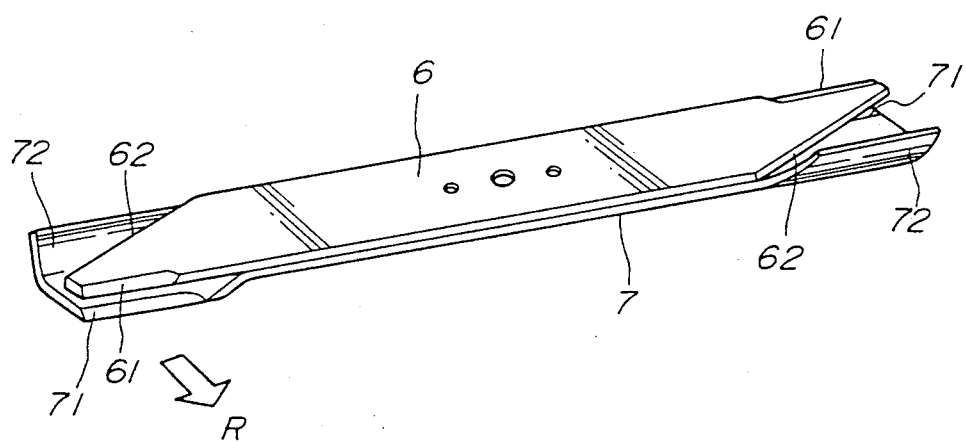
FIG. 3 is a perspective view of a pair of vertically superposed cutter blades of the cutter device shown in FIG. 1.
Figure 4:
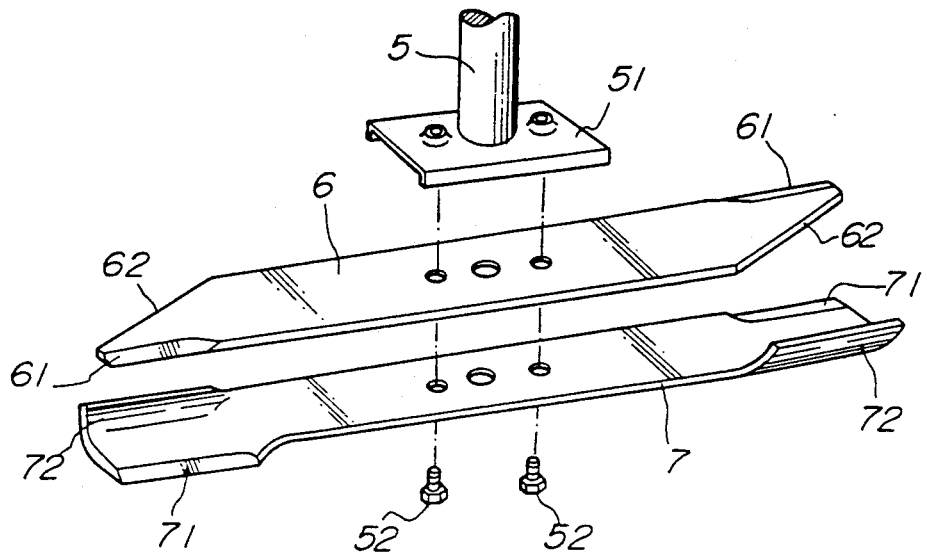
FIG. 4 is an exploded perspective view of the cutter blades shown in FIG. 3 and a rotatable shaft to which the cutter blades are coupled.

The upper and lower cutter blades 6, 7, which are shaped as shown in FIGS. 3 and 4, rotate in the direction indicated by the arrow R. The upper cutter blade 6 is in the form of a flat elongate plate having cutting edges 61 on opposite distal end regions, facing forwardly in the direction R of rotation, and tapered edges 62 disposed behind the respective cutting edges 61 in the direction R of rotation. The lower cutter blade 7 is in the form of a pressed elongate plate having cutting edges 71 on opposite distal end regions, facing forwardly in the direction R of rotation, and raised portions 72 smoothly curved upwardly and disposed behind the respective cutting edges 71 in the direction R of rotation. The lower cutter blade 7 has a central region joined to the distal end regions thereof through respective intermediate regions that are bent so that the distal end regions are lower than the central region.

The upper cutter blade 6 is longitudinally aligned with and superposed on the lower cutter blade 7 parallel to each other in their central regions. The central regions of the upper and lower cutter blades 6, 7 are fastened by bolts 52 to a joint plate 51 that is fixed to the lower end of the rotatable shaft 5, as shown in FIG. 4.

Figure 5:
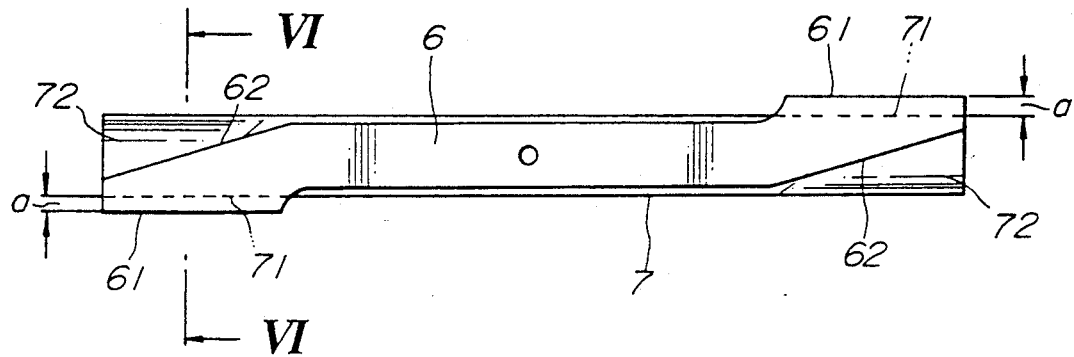
FIG. 5 is a plan view of the cutter blades shown in FIG. 3.
Figure 6:
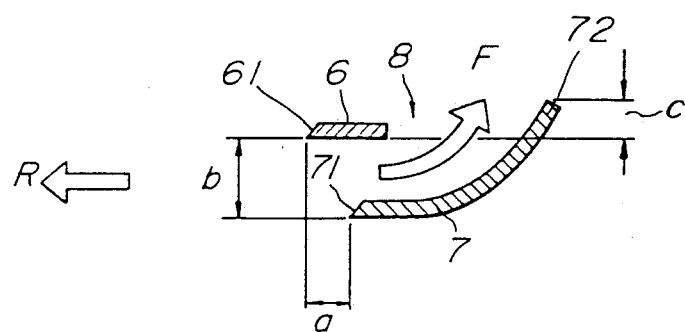
FIG. 6 is an enlarged cross-sectional view taken along line VI—VI of FIG. 5.

As shown in FIGS. 5 and 6, the cutting edges 61 of the upper cutter blade 6 are horizontally spaced forwardly from the cutting edges 71 of the lower cutter blade 7 by a distance a in the direction R of rotation. The cutting edges 61, 71 of the upper and lower cutter blades 6, 7, which are substantially parallel to each other, or the distal end regions thereof, are vertically spaced from each other by a distance b. The upwardly raised portions 72 of the lower cutter blade 7 are higher than the cutting edges 61 of the upper cutter blade 6 by a distance c. These distances or dimensions a, b, c will be described later on.

As described above, the opposite distal end regions of the upper cutter blades 6 have the tapered edges 62 disposed behind the respective cutting edges 61 in the direction R of rotation, and the opposite distal end regions of the lower cutter blades 7 have the upwardly raised portions 72 disposed behind the respective cutting edges 71 in the direction R of rotation. Therefore, the average width in the direction R of rotation of the distal end regions of the lower cutter blade 7 which include the cutting edges 71 and the raised portions 72 is larger in plan than the average width in the direction R of rotation of the distal end regions of the upper cutter blade 6 which include the cutting edges 61 and the tapered edges 62. The upwardly raised portions 72 are smoothly curved upwardly behind the cutting edges 71 in the wider distal end regions of the lower cutter blade 7, providing openings or gaps between the raised portions 72 and the tapered edges 62. Accordingly, air passages 8 (FIG. 6) are defined between the upper and lower distal end regions including the cutting edges 61, 71 for allowing air to flow from the forward side in the direction indicated by the arrow F.

Figure 2:
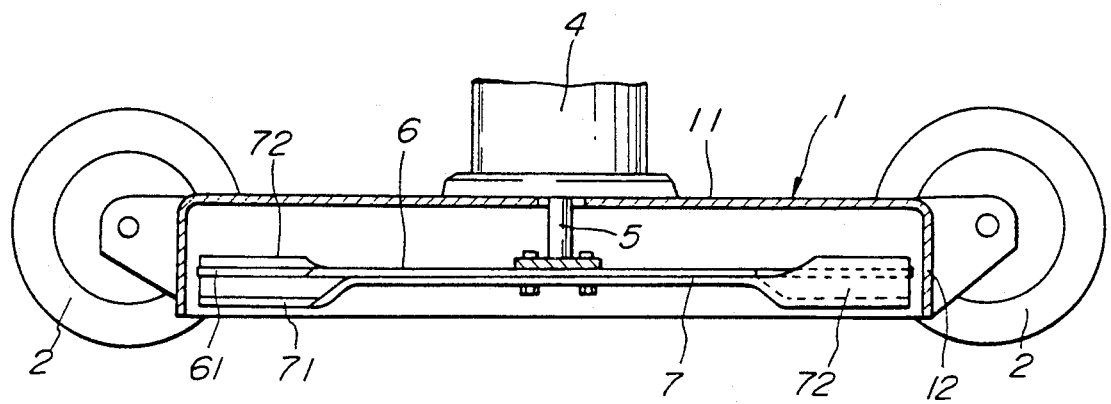
FIG. 2 is a vertical sectional side elevational view of a cutter housing of the cutter device shown in FIG. 1.

As shown in FIG. 2, the distal end regions of the upper and lower cutter blades 6, 7 are positioned closely to the inner surface of the circumferential wall 12 of the cutter housing 1.

Figure 7A:
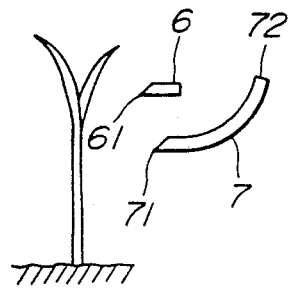
FIGS. 7a, 7b, and 7c are views illustrative of the manner in which a piece of grass is progressively clipped by the cutter device according to the first embodiment.

Operation of the lawn mower of the above structure will be described below. Since the cutter device according to this embodiment is composed of the two upper and lower cutter blades 6, 7, when the cutter blades 6, 7 rotate, each of the leading upper cutting edges 61 cuts off an upper portion of grass, as shown in FIGS. 7a and 7b, and then each of the trailing lower cutting edges 71 cuts off the grass to a shorter length with a slight time lag, as shown in FIG. 7c.

Figure 7B:
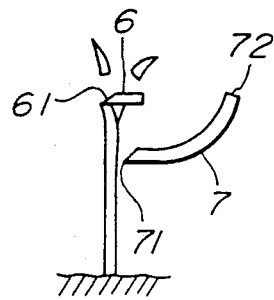
Figure 7C:
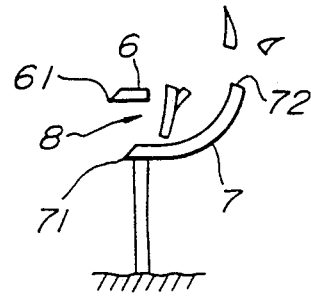

When the grass is clipped the second time by the lower cutting edge 71, air flows between the upper and lower cutting edges 61, 71 or through the air passage 8 between the upper and lower distal end regions upwardly along the smoothly curved, upwardly raised portion 72, developing a vacuum to lift the remaining grass as shown in FIG. 7b. Therefore, the remaining grass can reliably be cut off to a shorter length by the lower cutting edge 71, as shown in FIG. 7c.

The grass clippings are forced upwardly on the air flow through the air passage 8 along the upwardly raised portion 72. The grass clippings that are thus caused to fly upwardly drop onto the rotating cutter blades 6, 7, and are cut off again into smaller clippings by the cutting edges 61, 71.

The lawn mower with the cutter device incorporated therein is thus capable of raising the grass while mowing a lawn, i.e., while the cutter blades 6, 7 are rotating, so that the grass can neatly be finished and the grass clippings can be cut off into smaller clippings.

Figure 8:
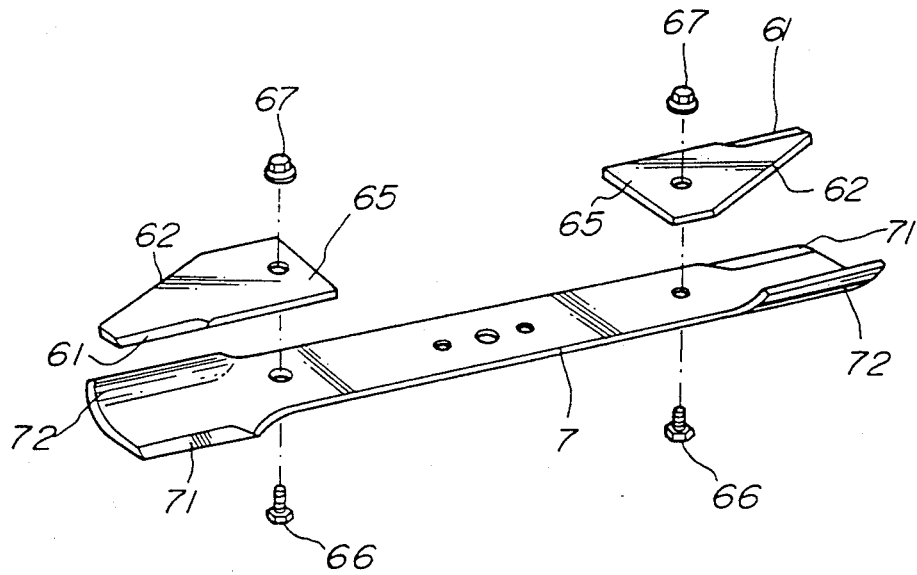
FIG. 8 is an exploded perspective view of a modification of the cutter blades of the cutter device according to the first embodiment.

According to a modification of the cutter device of the first embodiment, as shown in FIG. 8, the upper cutter blade 6 is not a single elongate cutter blade, but comprises two cutter blade members 65 corresponding to the respective distal end regions of the cutter blade 6 and having respective cutting edges 61. The cutter blade members 65 are fastened to the lower cutter blade 7 over the respective cutting edges 71 by bolts 66 and nuts 67. Alternatively, the lower cutter blade 7 may not be a single elongate cutter blade, but may comprise two cutter blade members corresponding to the respective distal end regions of the cutter blade 7 and having respective cutting edges 71 and upwardly raised portions 72. The cutter blade members may be fastened to the upper cutter blade 6 beneath the respective cutting edges 61 by bolts and nuts.

The cutter device according to the first embodiment has been described as being incorporated in a walking-type lawn mower with a closed cutter housing. However, the cutter device may be incorporated in a walking-type lawn mower with a discharge-type cutter housing, or a riding-type lawn mower with a closed cutter housing or a discharge-type cutter housing.

A cutter device according to a second embodiment of the present invention will be described below.

Figure 9:
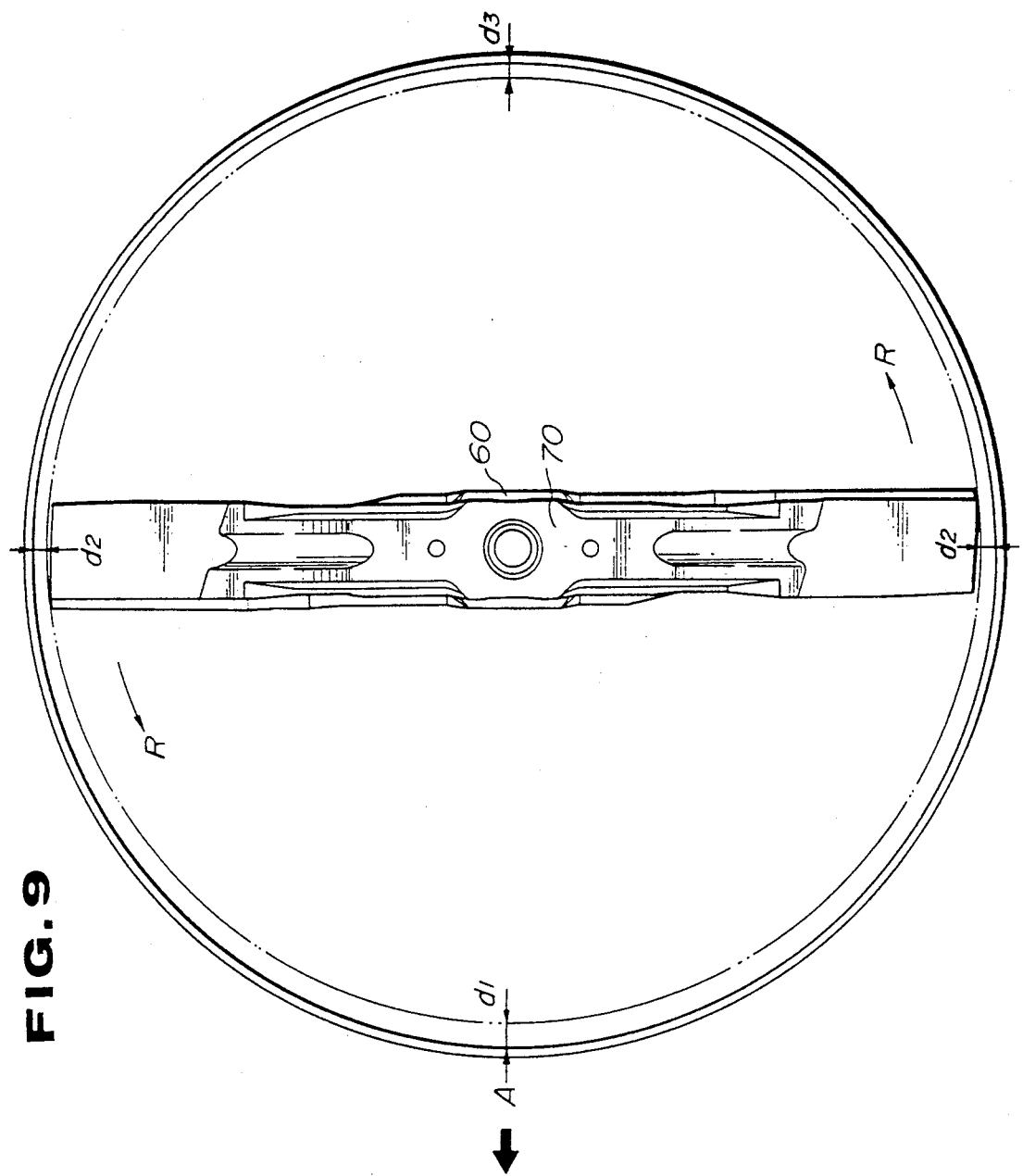
FIG. 9 is a bottom view of a cutter housing of a cutter device according to a second embodiment of the present invention.
Figure 10:
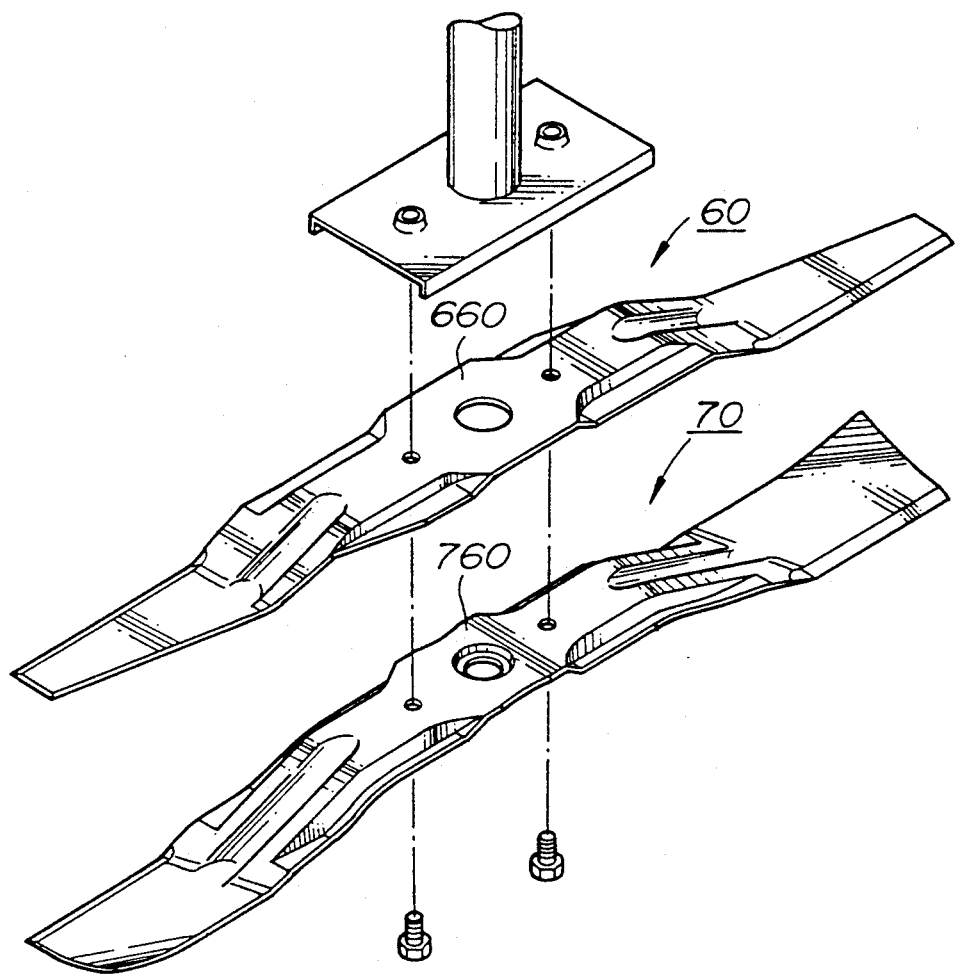
FIG. 10 is an exploded perspective view of cutter blades and a rotatable shaft to which the cutter blades are coupled, of the cutter device according to the second embodiment.
Figure 18:
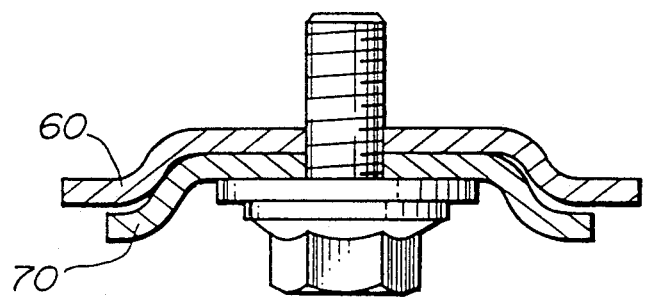
FIG. 18 is an enlarged cross-sectional view taken along line XVIII—XVIII of FIG. 13.

FIG. 9 shows a substantially cylindrical cutter housing 10 of a lawn mower which incorporates the cutter device according to the second embodiment. As shown in FIGS. 9 and 10, the cutter device according to the second embodiment comprises a pair of upper and lower cutter blades 60, 70 that are vertically superposed one on the other in longitudinal alignment with each other. The cutter blades 60, 70 have respective superposed central regions 660, 760 that are aligned with and parallel to each other, and are fastened by bolts (FIGS. 10 and 18) through a holder (FIG. 10) to the lower end of a substantially vertical rotatable shaft that is driven by an engine. The cutter blades 60, 70 can be rotated in a substantially horizontal plane in the direction indicated by the arrow R within a cutter housing 10.

Figure 11A:
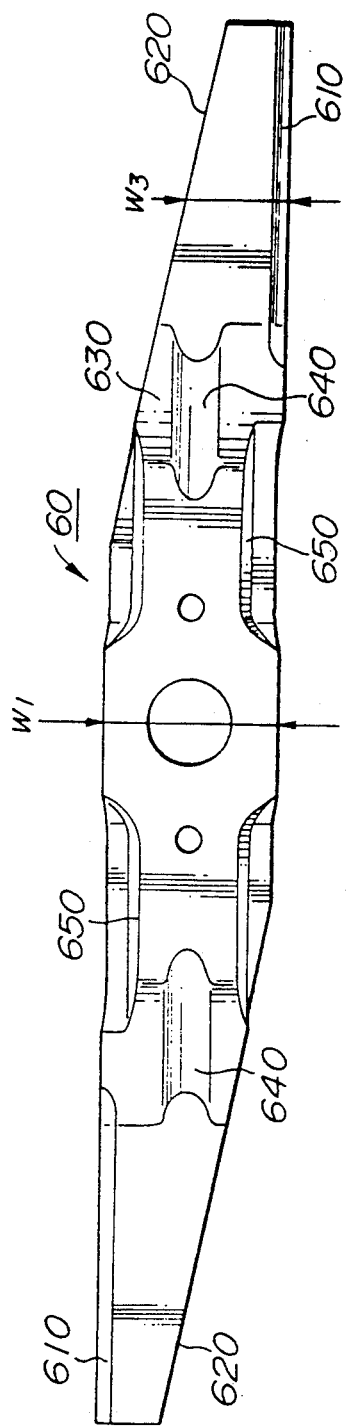
FIG. 11a is a plan view of the upper cutter blade shown in FIG. 10.
Figure 11B:
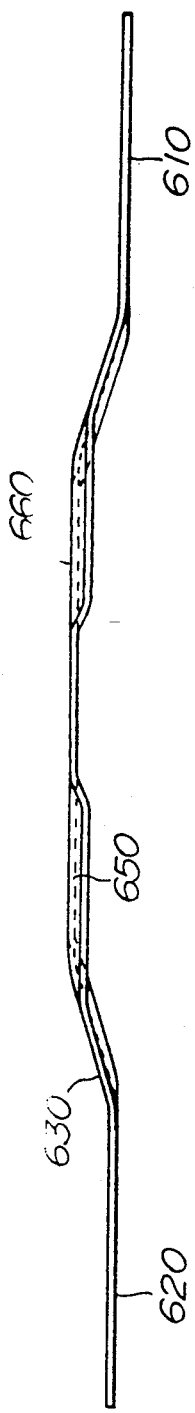

As shown in FIGS. 11a and 11b, the upper cutter blade 60 is in the form of a pressed elongate plate having cutting edges 610 on opposite distal end regions, facing forwardly in the direction R of rotation, and tapered edges 620 disposed behind the respective cutting edges 610 in the direction R of rotation. The upper cutter blade 60 has a central region 660 joined to the distal end regions thereof through respective intermediate regions that are bent as stepped regions 630 so that the distal end regions are lower than the central region 660. The cutting edges 610 extend into the respective stepped regions 630, and the tapered edges 620 extend through the stepped regions 630 into the central region 660. The stepped regions 630 serve to dampen shocks that would otherwise be transmitted to the distal end regions. The stepped regions 630 have respective grooves 640 extending along the longitudinal axis of the upper cutter blade 60 and projecting downwardly, thereby making the stepped regions 630 rigid enough to resist shocks. The central region 660 of the upper cutter blade 60 is raised upwardly in its major portion bounded by rims 650 for increased rigidity.

Figure 12A:
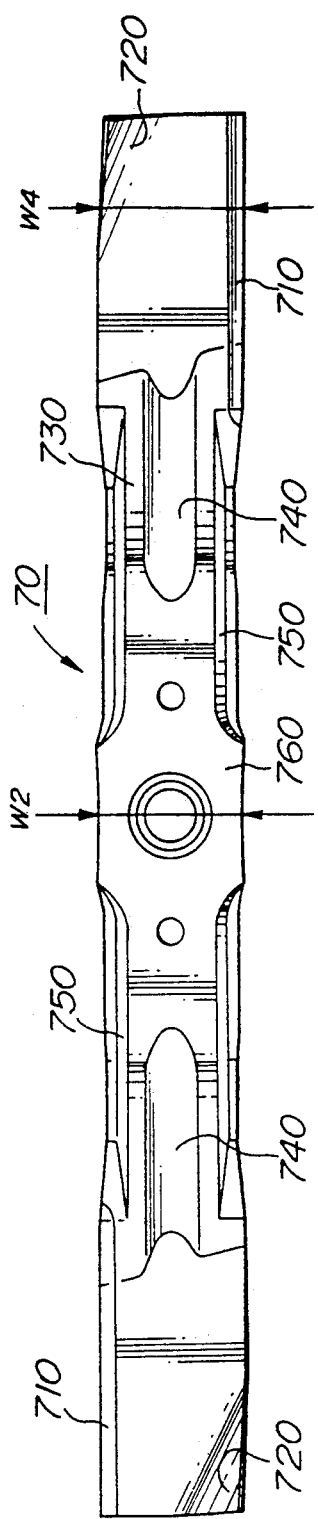
FIG. 12a is a plan view of the lower cutter blade shown in FIG. 10.
Figure 12B:
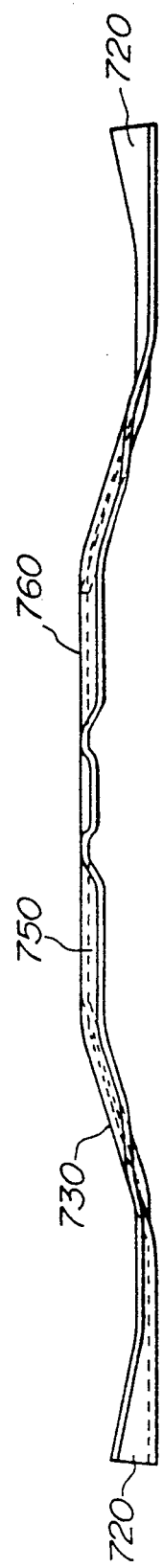

As shown in FIGS. 12a and 12b, the lower cutter blade 70 is in the form of a pressed elongate plate having cutting edges 710 on opposite distal end regions, facing forwardly in the direction R of rotation, and raised portions 720 disposed behind the respective cutting edges 710 in the direction R of rotation. The raised portions 720 are smoothly curved upwardly obliquely inwardly with respect to the longitudinal axis of the lower cutter blade 70, the raised portions 720 having a radius of curvature of about 60 mm (see FIG. 14). The raised portions 720 are substantially triangular in shape as viewed in plan. The lower cutter blade 70 has a central region 760 joined to the distal end regions thereof through respective intermediate regions that are bent as stepped regions 730 so that the distal end regions are lower than the central region 760. The cutting edges 710 extend into the respective stepped regions 730, and serve to dampen shocks that would otherwise be transmitted to the distal end regions. The stepped regions 730 have respective grooves 740 extending along the longitudinal axis of the lower cutter blade 70 and projecting downwardly, thereby making the stepped regions 730 rigid enough to resist shocks. The grooves 740 are dimensioned to receive the lower projecting surfaces of the grooves 640 of the upper cutter blade 60. The central region 760 of the lower cutter blade 70 is raised upwardly in its major portion bounded by rims 750 for increased rigidity. The raised central region 760 is dimensioned to fit in the lower cavity defined below the raised central region 660 of the upper cutter blade 60.

As shown in FIGS. 11a and 12a, the central regions 660, 760 of the upper and lower superposed cutter blades 60, 70 have respective average widths W1, W2 in the direction R of rotation. As also shown in FIG. 13, the average width W2 of the lower cutter blade 70 is smaller than the average width W1 of the upper cutter blade 60. Therefore, the upper and lower cutter blades 60, 70 have front and rear longitudinal edges out of alignment with each other, as shown in FIG. 14. The front edges of the cutter blades 60, 70 are thus less liable to produce whistling sound as they rotate through the air, and air swirls are also less likely to develop behind the rear edges of the cutter blades 60, 70 when they rotate. Accordingly, the cutter blades 60, 70 do not produce large noise as they rotate through the air. As shown in FIGS. 11a and 12a, the distal end regions of the cutter blades 60, 70 have respective average widths W3, W4, and the average width W4 is larger than the average width W3.

As shown in FIGS. 14 through 17, the cutting edges 610 of the upper cutter blade 60 are horizontally spaced forwardly from the cutting edges 710 of the lower cutter blade 70 by a distance a in the direction R of rotation. The cutting edges 610, 710 of the upper and lower cutter blades 60, 70, which are substantially parallel to each other, or the distal end regions thereof, are vertically spaced from each other by a distance b. Accordingly, air passages are defined between the upper and lower cutting edges 610, 710. The upwardly raised portions 720 of the lower cutter blade 70 are higher than the cutting edges 610 of the upper cutter blade 60 by a distance c, defining openings behind the cutting edges 610 closely to the tapered edges 620. These distances or dimensions a, b, c will also be described later on.

The lawn mower with the cutter device according to the second embodiment is also capable of raising the grass while mowing a lawn, i.e., while the cutter blades 60, 70 are rotating, so that the grass can neatly be finished and the grass clippings can be cut off into smaller clippings.

Based on various experiments, the dimensions a, b, c referred to above are determined to be in the following ranges: $2 \text{ mm} \leq a \leq 8 \text{ mm}$, $10.9 \text{ mm} \leq b \leq 18 \text{ mm}$, and $0.1 \text{ mm} \leq c \leq 7.1 \text{ mm}$. It has been found that these dimensional values are effective to achieve optimum mowing performances, to cut off the grass into small clippings and neatly finish the lawn, and to minimize noise such as whistling sound produced by the cutter blades as they rotate. If the air passages between the upper and lower cutter blades are selected to be of an optimum clearance, then they are prevented from being clogged with grass clippings, and any wear of the upper and lower cutter blades due to engagement with grass clippings and sand or other foreign matter is reduced.

In the second embodiment, the circular path of the outermost ends of the cutter blades 60, 70 and the inner surface of the circumferential wall of the cutter housing 10 should be spaced from each other by a predetermined distance, as shown in FIG. 9. More specifically, the inner surface of the circumferential wall of the cutter housing 10 is substantially cylindrical in shape, but should preferably somewhat project outwardly in the direction indicated by the arrow A in which the lawn mower moves forwardly. Preferably, the distance $d_1$ between the front inner surface of the circumferential wall of the cutter housing 10 and the circular path of the outermost ends of the cutter blades 60, 70 should be of about 20.5 mm or in the range of $15.0 \text{ mm} \leq d_1 \leq 25.0 \text{ mm}$. The distance $d_2$ between the laterally opposite inner surfaces of the circumferential wall of the cutter housing 10 and the circular path of the outermost ends of the cutter blades 60, 70, and also the distances $d_3$ between the rear inner surface of the circumferential wall of the cutter housing 10 and the circular path of the outermost ends of the cutter blades 60, 70 should be about 8.7 mm. Particularly, the distance $d_2$ should be kept within the range of 6.0 mm $\leq d_2 \leq$ 12.0 mm.

If the distance $d_1$ were smaller than 15.0 mm, then the front portion of the circumferential wall of the cutter housing 10 would tend to interfere with the cutter blades 60, 70 when the front portion of the circumferential wall is pushed into the cutter housing 10 by a rock or the like while the lawn mower is moving forwardly. If the distance $d_1$ were larger than 25.0 mm, then the mowing performance of the lawn mower might be reduced. Accordingly, the distance $d_1$ should preferably be of about 20.5 mm or in the range of 15.0 mm $\leq d_1 \leq$ 25.0 mm.

If the distance $d_2$ were smaller than 6.0 mm, the gap between the circumferential wall of the cutter housing 10 and the outermost ends of the cutter blades 60, 70 would easily be clogged with grass clippings, imposing an excessive load on the cutter blades 60, 70. If the distance $d_2$ were larger than 12.0 mm, then grass clippings would drop from the opposite sides of the cutter housing 10 onto the lawn, forming ridges of glass clippings on the lawn parallel to the direction in which the lawn mower moves forwardly.

The upwardly curved raised portions 720 of the lower cutter blade 70 that are raised obliquely inwardly are effective to direct grass clippings inwardly of the cutter housing 10, thus scattering the grass clippings uniformly over the lawn range below the cutter housing 10. Therefore, the upwardly curved raised portions 720 prevent grass clippings from forming ridges on the lawn.

The specific dimensional values of the distances $d_1$, $d_2$, $d_3$ in the second embodiment are also applicable to the cutter device according to the first embodiment of the present invention.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

We claim:

1. A cutter device for use in a lawn mower having a substantially vertical rotatable shaft, comprising:
   a lower cutter blade adapted to be coupled to the rotatable shaft and substantially horizontally rotatable in a direction, said lower cutter blade having a distal end region including a cutting edge facing in said direction; and
   an upper cutter blade adapted to be coupled to the rotatable shaft and substantially horizontally rotatable in said direction, said upper cutter blade extending substantially parallel to said lower cutter blade, and having a distal end region including a cutting edge facing in said direction and positioned forwardly of said cutting edge of the lower cutter blade;
   said distal end regions of the lower and upper cutter blades having respective widths in said direction, said width of the distal end region of said lower cutter blade being larger than said width of the distal end region of said upper cutter blade, said distal end regions of the lower and upper cutter blades extending substantially parallel to each other and being vertically spaced from each other, with an air passage defined therebetween, said lower cutter blade having a substantially upwardly raised portion disposed behind the cutting edge thereof in said direction for directing an air flow upwardly in said air passage.

2. A cutter device according to claim 1, wherein said substantially upwardly raised portion of the lower cutter blade is higher than the cutting edge of said upper cutter blade.

3. A cutter device according to claim 1, wherein said upper cutter blade has a tapered edge disposed behind the cutting edge thereof in said direction, with an opening defined between said tapered edge and said substantially upwardly raised portion of the lower cutter blade as part of said air passage.

4. A cutter device according to claim 1, wherein said cutting edge of said upper cutter blade is spaced forwardly in said direction from said cutting edge of said lower cutter blade by a distance a substantially in the range of 2 mm $\leq a \leq$ 8 mm.

5. A cutter device according to claim 1, wherein said cutting edges of said upper and lower cutter blades are vertically spaced from each other by a distance b substantially in the range of 10.9 mm $\leq b \leq$ 18 mm.

6. A cutter device according to claim 2, wherein said substantially upwardly raised portion of said lower cutter blade is higher than said cutting edge of said upper cutter blade by a distance c substantially in the range of 0.1 mm $\leq c \leq$ 7.1 mm.

7. A cutter device according to claim 1, further including a downwardly opening cutter housing comprising an upper wall and a circumferential wall extending therefrom, said upper and lower cutter blades being housed in said cutter housing, said circumferential wall having an inner surface spaced from the path of outermost ends of said upper and lower cutter blades as they rotate.

8. A cutter device according to claim 7, wherein said circumferential wall has a front inner surface in a direction in which the lower mower is movable forwardly, said front inner surface being spaced from said path by a distance $d_1$ substantially in the range of 15.0 mm $\leq d_1 \leq$ 25.0 mm.

9. A cutter device according to claim 8, wherein said distance $d_1$ is of about 20.5 mm.

10. A cutter device according to claim 7, wherein said circumferential wall has opposite side inner surfaces in a direction in which the lower mower is movable forwardly, said side inner surfaces being spaced from said path by a distance $d_2$ substantially in the range of 6.0 mm $\leq d_2 \leq$ 12.0 mm.

11. A cutter device according to claim 10, wherein said distance $d_2$ is of about 8.7 mm.

12. A cutter device according to claim 1, wherein said substantially upwardly raised portion of the lower cutter blade is smoothly curved upwardly obliquely inwardly with respect to a longitudinal direction of said lower cutter blade.

13. A cutter device for use in a lawn mower having a substantially vertical rotatable shaft, comprising:
   a lower cutter blade adapted to be coupled to the rotatable shaft and substantially horizontally rotatable in a direction, said lower cutter blade having a distal end region including a cutting edge facing in said direction; and an upper cutter blade adapted to be coupled to the rotatable shaft and substantially horizontally rotatable in said direction, said upper cutter blade extending substantially parallel to said lower cutter blade, and having a distal end region including a cutting edge facing in said direction and positioned forwardly of said cutting edge of the lower cutter blade;

said distal end regions of the lower and upper cutter blades extending substantially parallel to each other and being vertically spaced from each other, with an air passage defined therebetween, said lower cutter blade having a substantially upwardly raised portion disposed behind the cutting edge thereof in said direction for directing an air flow upwardly in said air passage;

said lower and upper cutter blades being longitudinally aligned with each other and having respective central regions vertically superposed and adapted to be coupled to the rotatable shaft, said central regions of the lower and upper cutter blades having respective widths in said direction, said width of the central region of said lower cutter blade being smaller than said width of the central region of said upper cutter blade.

14. A cutter device according to claim 13, wherein said distal end regions of the lower and upper cutter blades have respective widths in said direction, said width of the distal end region of said lower cutter blade being larger than said width of the distal end region of said upper cutter blade.

15. A cutter device according to claim 13, wherein said substantially upwardly raised portion of the lower cutter blade is higher than the cutting edge of said upper cutter blade.

16. A cutter device according to claim 13, wherein said upper cutter blade has a tapered edge disposed behind the cutting edge thereof in said direction, with an opening defined between said tapered edge and said substantially upwardly raised portion of the lower cutter blade as part of said air passage.

17. A cutter device according to claim 13, wherein said cutting edge of said upper cutter blade is spaced forwardly in said direction from said cutting edge of said lower cutter blade by a distance a substantially in the range of $2\text{ mm} \leq a \leq 8\text{ mm}$.

18. A cutter device according to claim 13, wherein said cutting edges of said upper and lower cutter blades are vertically spaced from each other by a distance b substantially in the range of $10.9\text{ mm} \leq b \leq 18\text{ mm}$.

19. A cutter device according to claim 15, wherein said substantially upwardly raised portion of said lower cutter blade is higher than said cutting edge of said upper cutter blade by a distance c substantially in the range of $0.1\text{ mm} \leq c \leq 7.1\text{ mm}$.

20. A cutter device according to claim 13, further including a downwardly opening cutter housing comprising an upper wall and a circumferential wall extending therefrom, said upper and lower cutter blades being housed in said cutter housing, said circumferential wall having an inner surface spaced from the path of outermost ends of said upper and lower cutter blades as they rotate.

21. A cutter device according to claim 20, wherein said circumferential wall has a front inner surface in a direction in which the lower mower is movable forwardly, said front inner surface being spaced from said path by a distance $d_1$ substantially in the range of $15.0\text{ mm} \leq d_1 \leq 25.0\text{ mm}$.

22. A cutter device according to claim 21, wherein said distance $d_1$ is of about 20.5 mm.

23. A cutter device according to claim 20, wherein said circumferential wall has opposite side inner surfaces in a direction in which the lower mower is movable forwardly, said side inner surfaces being spaced from said path by a distance $d_2$ substantially in the range of $6.0\text{ mm} \leq d_2 \leq 12.0\text{ mm}$.

24. A cutter device according to claim 23, wherein said distance $d_2$ is of about 8.7 mm.

25. A cutter device according to claim 13, wherein said substantially upwardly raised portion of the lower cutter blade is smoothly curved upwardly obliquely inwardly with respect to a longitudinal direction of said lower cutter blade.

26. A cutter device for use in a lawn mower having a substantially vertical rotatable shaft, comprising:

a lower cutter blade adapted to be coupled to the rotatable shaft and substantially horizontally rotatable in a direction, said lower cutter blade having a distal end region including a cutting edge facing in said direction;

an upper cutter blade adapted to be coupled to the rotatable shaft and substantially horizontally rotatable in said direction, said upper cutter blade extending substantially parallel to said lower cutter blade, and having a distal end region including a cutting edge facing in said direction and positioned forwardly of said cutting edge of the lower cutter blade;

said distal end regions of the lower and upper cutter blades extending substantially parallel to each other and being vertically spaced from each other, with an air passage defined therebetween, said lower cutter blade having a substantially upwardly raised portion disposed behind the cutting edge thereof in said direction for directing an air flow upwardly in said air passage;

a downwardly opening cutter housing comprising an upper wall and a circumferential wall extending therefrom, said upper and lower cutter blades being housed in said cutter housing;

said circumferential wall having laterally opposite inner surfaces with respect to a direction in which the lawn mower is movable forwardly, said laterally opposite inner surfaces being spaced from the path of outermost ends of said upper and lower cutter blades as they rotate by a distance d substantially in the range of $6.0\text{ mm} \leq d \leq 12.0\text{ mm}$.

27. A cutter device according to claim 26, wherein said distance d is of about 8.7 mm.

28. A cutter device according to claim 26 wherein said circumferential wall has a front inner surface in the direction in which the lawn mower is movable forwardly, said front inner surface being spaced at a larger distance from said path than said distance d.

* * * * *

UNITED STATES PATENT AND TRADEMARK OFFICE
CERTIFICATE OF CORRECTION

PATENT NO. : 5,259,176
DATED : November 9, 1993
INVENTOR(S) : Ryo Kahamura; Kenjiro Hiratsuna, Naoki Kinoshita It is certified that error appears in the above-identified patent and that said Letters Patent is hereby corrected as shown below:

On the title page: Item [54] and Column 1, line 1,
In the title, change "Cotter" to --Cutter--.

Item [75]
Under the Inventors, change "Kenjiro Haratsuna" to

--Kenjiro Hiratsuna--.

Signed and Sealed this

Sixteenth Day of August, 1994

Attest:

BRUCE LEHMAN

Attesting Officer

Commissioner of Patents and Trademarks